United States Patent [19]

Hess et al.

[11] 4,393,787

[45] * Jul. 19, 1983

[54] ROLLER SIDE BEARING MOUNTING SYSTEM AND METHOD

[75] Inventors: George M. Hess, Huron; James A. Zils, North Royalton, both of Ohio

[73] Assignee: Russell, Burdsall & Ward Corporation, Cleveland, Ohio

[*] Notice: The portion of the term of this patent subsequent to Apr. 6, 1999, has been disclaimed.

[21] Appl. No.: 365,881

[22] Filed: Apr. 5, 1982

Related U.S. Application Data

[63] Continuation of Ser. No. 135,480, Mar. 31, 1980, Pat. No. 4,323,015.

[51] Int. Cl.³ .......................... F16B 5/02; F16B 31/02
[52] U.S. Cl. ............................ 105/199 CB; 29/526 R; 29/148.4 D; 308/226; 411/1; 411/371
[58] Field of Search ................... 411/1, 368, 371, 402, 411/531, 533; 308/226; 403/41, 408; 105/199 CB; 29/148.4 C, 148.4 D, 526 R

[56] References Cited

U.S. PATENT DOCUMENTS

| | | | |
|---|---|---|---|
| 1,806,003 | 5/1931 | Stucki | 308/226 |
| 1,961,794 | 6/1934 | Severn | 308/226 |
| 2,739,853 | 3/1956 | Hicks | 308/226 |
| 3,556,570 | 1/1971 | Cosenza | 287/189.36 |
| 3,596,656 | 8/1971 | Kaute | 128/92 |
| 3,746,067 | 7/1973 | Gulistan | 151/69 |
| 3,854,372 | 12/1974 | Gutshall | 85/61 |

Primary Examiner—Richard A. Bertsch
Attorney, Agent, or Firm—Fay & Sharpe

[57] ABSTRACT

A system and method for fixedly securing a roller side bearing assembly to the top surface portion of a rail car truck assembly. Elongated threaded fasteners pass through registered openings in a bearing cage bottom wall and truck assembly top surface portion in threaded receipt by locknuts disposed on the underside of the top surface portion. A washer captured on each fastener includes at least a portion thereof which is closely interposed between the fastener head and the bearing cage bottom wall at the associated opening. The fasteners are rotated into threaded advancement with the locknuts to achieve fastener clamploads which fall within predetermined upper and lower limits. Each fastener head advantageously includes a hex type wrench receiving opening which has a limited maximum torque capacity generally correlated to obtaining a fastener clampload no greater than the predetermined upper limit. The washer geometry facilitates use of better or improved fastener head fillets. In addition, the fasteners advantageously have undersized bodies or shanks immediately adjacent the heads to reduce bending stresses experienced therein. The overall structural features and manner of installation provide a fatigue resistant, somewhat torque limiting roller side bearing mounting system and method. The results obtained enable the fasteners to withstand periodic bending loads applied thereagainst during normal rail car use.

22 Claims, 5 Drawing Figures

ROLLER SIDE BEARING MOUNTING SYSTEM AND METHOD

This application is a continuation of application Ser. No. 135,480, filed Mar. 31, 1980, now U.S. Pat. No. 4,323,015.

BACKGROUND OF THE INVENTION

This invention pertains to the art of connecting systems and more particularly to such a system which employs an elongated mechanical fastener which is periodically subjected to bending loads.

The invention is particularly applicable to a system and method for fixedly securing a roller side bearing assembly to a rail car truck assembly and will be described with particular reference thereto. However, it will be appreciated by those skilled in the art that the invention may be readily adapted to use in other applications and environments.

Rail car truck assemblies, i.e., wheel assemblies, are designed to swivel relative to the car itself. Such swiveling is required in order that the trucks may follow the path of the rails. Initially, the trucks were simply pivotally connected to a bottom surface or area of the rail cars with fixed bearing surfaces cooperably interposed between the trucks and car bottom areas. However, frictional forces generated at these bearing surfaces during relative movement between the truck assemblies and their associated cars were greater than desired for achieving optimum operational conditions. It has been determined that these frictional forces and the resultant resistance to swiveling have been primarily responsible for many train derailments, premature wheel flange wear, rail wear and resistance to car movement along the rails.

To overcome the aforementioned problems, the vast majority of new rail cars include or are equipped with roller side bearing assemblies. These bearing assemblies are fixedly secured to the rail car trucks and cooperably interposed between the trucks and associated car bottom area for reducing frictional forces during swivel movement of the trucks. Basically, these roller side bearing assemblies each include an elongated generally U-shaped bearing cage having a bottom wall fixedly secured to a top surface portion of the associated truck assembly. The bearing assemblies are normally mounted to the laterally extending truck cross member on opposite sides of the truck pivot mounting. One or more cylindrical rollers or bearings is received in the U-shaped cage to extend between spaced apart bearing cage side walls. Roller engagement with the bottom area of the associated rail car produces a rolling action during swivel movement of the truck. Because the coefficient of rolling friction is less than 0.01 and the coefficient of two sliding surfaces of cast or rolled steel is usually greater than 0.25, use of the above described roller side bearing assemblies has greatly reduced the resistance to truck swiveling.

Even though roller side bearings have proved to be extremely advantageous, there have nevertheless been undesired failures occurring at the areas of interconnection between the bearing cages and trucks. Heretofore, the cages have oftentimes been riveted in place. However, during the course of rolling travel of the car, the roller side bearing assemblies are subjected to a wide range of cycle forces which are, in turn, transmitted to the rivets. The cycling forces, including tensile bending or shear loads, often cause premature failure therein. Moreover, other types of fastening arrangements which have been attempted have encountered similar failure problems because of the inability to obtain proper loading conditions therein.

For example, and in the case of conventional threaded fasteners such as bolts and the like, they are not capable of withstanding the general type of cyclical bending or shear loads which are applied thereagainst during normal rail car use. As a result, the fasteners fail prematurely and set up an undesirable or improper cooperative relationship between the truck assembly, roller side bearing assemblies and the rail car. Indeed, such failure may establish dangerous operating conditions for the rail car which, if left undetected, could lead to car derailment. When fastener failure is detected, replacement thereof is both costly and time consuming since the rail car must be temporarily removed from further service.

In addition, it is also difficult to consistently obtain the specified or requisite clampload on conventional threaded fasteners. The clampload is obtained by means of applying a torquing force to each fastener or its associated nut in order to obtain tightening or threaded advancement therebetween. However, this torque is neither a measure of nor directly convertible to the amount of clampload obtained. Because of the various frictional forces acting on a threaded fastener or bolt during torquing, i.e., between the bolt head and the surface of the adjacent component, between the threaded bolt shank and an associated nut, and between the nut and the adjacent component, it has heretofore been virtually impossible to correlate the application of some predetermined torque to the resultant loading which is obtained.

Further, conventional threaded fasteners do not include any means for preventing over-tightening. Commonly used assembly tools in rail car shops do not have torque measuring capabilities. Thus, undesired and unacceptable fastener over-tightening is a frequent occurrence. The potential for either under or over-tightened fastener conditions to be present is further increased in the environment of mounting roller side bearing assemblies to rail car trucks because the components involved are fairly large and tend to have fairly rough or uneven surfaces. This then causes the various frictional forces to vary substantially between individual installations.

It has, therefore, been desired to develop a system and/or method for fixedly mounting roller side bearing assemblies to rail car truck assemblies wherein the particular elongated fasteners employed will survive cyclical bending loads applied thereagainst without premature failure and wherein the fasteners include means for preventing over-tightening thereof. Such a system and method should allow fastener installations in a production type situation and permit generally consistent clamploads to be obtained for the individual fastener installations.

The present invention contemplates a new and improved system and method which overcomes all of the above referred to problems and others and provides a mounting system and method for side roller bearing assemblies which is simple, economical, facilitates a fatigue resistant and somewhat torque limiting arrangement, is reliable and which may be adapted to use for a number of different applications.

BRIEF DESCRIPTION OF THE INVENTION

In accordance with the present invention, there is provided a system and method for mounting a roller side bearing assembly to an associated rail car truck assembly. The system and method utilize elongated mechanical fasteners which, because of their particular physical characteristics and cooperative relationships with the bearing and truck assemblies, are particularly fatigue resistant or resist bending loads applied thereagainst during typical rail car travel. Also, the fasteners include means for limiting the amount of torque which may be applied thereto for maintaining the resultant clamploads below some upper limit.

More particularly, the system involves a rail car truck assembly which includes spaced wheels adapted to rollingly support a rail car on a pair of parallel spaced apart rails or tracks and wherein the truck assembly includes a top surface portion. The roller side bearing assembly has an elongated generally U-shaped bearing cage defined by a bottom wall and a pair of spaced apart generally parallel side walls upstanding therefrom. The bottom wall has at least a pair of spaced apart openings extending therethrough in registry with at least a pair of openings in the truck top surface portion. In addition, the bearing cage side walls have at least one cylindrical bearing or roller member extending therebetween adapted to supportingly engage an area of the rail car for reducing frictional forces generated during swivel movement between the car and truck assembly. An elongated threaded fastener extends through each of the pairs of registered bottom wall and top surface portion openings to fixedly secure the roller side bearing assembly to the truck. Each fastener has a head and an elongated shank threaded along at least the outermost end section thereof and wherein the head and shank interface at a distinct fillet area. Each fastener head is cooperable with the bearing cage bottom wall and the shank extends through an associated pair of the registered bottom wall and top surface portion openings into threaded engagement with a locknut disposed on the underside of the top surface portion. The fasteners are placed in some desired clampload condition within predetermined upper and lower limits by rotating the fasteners into threaded advancement with the locknuts. The desired clampload is less than an amount which would cause failure in the bearing cage and greater than an amount which would increase the potential for failure in the fasteners when they are subjected to bending loads resulting from loading the roller side bearing assembly during normal rolling travel of the rail car. The fasteners each further include means for limiting the torque applied thereto in order that the resultant fastener clamploads will not exceed the upper limit. Bearing means interposed between each fastener head and the bearing cage bottom wall facilitate control of frictional forces occurring at the fastener heads during rotation thereof into threaded engagement with the locknuts. The bearing means also protect the fastener fillet areas from being embedded by the bearing cage bottom wall at the bottom wall openings at least when the fasteners are subjected to cyclical bending loads.

In the preferred arrangement of the invention, each fastener shank includes an unthreaded section extending from the fillet area and merging into the threaded section. The unthreaded section desirably has a smaller diameter than the threaded section for reducing bending stresses in the fasteners when they are subjected to bending loads.

In accordance with another preferred aspect of the present invention, the bearing means comprises a washer member captured on the shank of each fastener. In one arrangement the fasteners have countersunk heads with the washers having a frusto-conical portion substantially conforming to the head configurations. These washers also include fillet portions which substantially conform to the fastener fillet areas. In another arrangement, the washers are substantially flat and the fastener fillet areas extend generally inward into the fastener heads. The washers are such that larger and/or better fastener fillet designs may be advantageously employed.

According to another aspect of the invention, the torque limiting means comprises a wrench receiving opening in each fastener head. These openings are dimensioned and configured to possess a predetermined maximum torque capacity after which material yielding of the opening substantially prevents further tightening.

The method of the subject invention involves fixedly securing a roller side bearing cage at the cage bottom wall to the to surface portion of a rail car truck assembly. The method comprises the steps of:

(a) passing the elongated shank of at least one mechanical fastener having a threaded portion at least along the outermost end thereof through registered openings in the cage bottom wall and the truck assembly top surface portion such that an enlarged head of the fastener is adjacent the bottom wall;

(b) interposing a bearing member between the fastener head and bottom wall for controlling frictional forces occuring therebetween and for protecting a distinct fillet area on the fastener at the interface between the fastener head and shank when bending loads are applied to the fastener in response to normal movement of a rail car with which the truck assembly is associated;

(c) rotating the fastener at the head so that the fastener shank threaded section is threadedly advanced into a locknut disposed on the underside of the top surface portion;

(d) continuing the step of rotating until a clampload falling within some predetermined upper and lower limits is obtained in the fastener; and, (e) providing means associated with the fastener head for limiting the amount of torque which may be applied thereto during the step of continuing whereby the resultant clampload will not exceed the upper limit.

The principal object of the present invention is the provision of a new and improved system and method for fixedly securing a roller side bearing assembly to a rail car truck assembly.

Another object of the invention is the provision of such a system and method which is simple in design and easy to implement.

Still another object of the invention is the provision of a system and method which are reliable in use and provide a fatigue resistant, somewhat torque limiting arrangement.

Still other objects and advantages for the subject invention will become apparent to those skilled in the art upon a reading and understanding of the following specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENT

Figure 1:
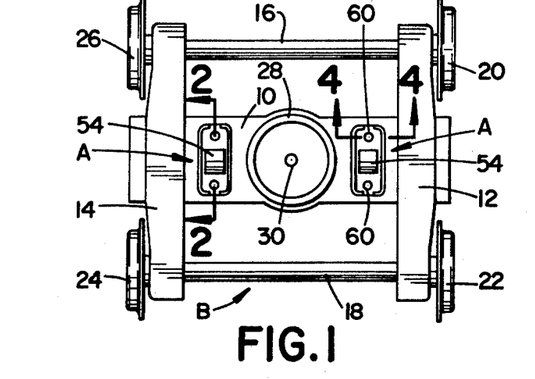
FIG. 1 is a plan view in somewhat schematic form generally showing a conventional rail car truck assembly having a pair of roller side bearing assemblies fixedly secured thereto.

Referring now to the drawings wherein the showings are for purposes of illustrating preferred embodiments of the invention only and not for purposes of limiting same, FIG. 1 shows in plan view a pair of roller side bearing assemblies A fixedly secured to a top surface portion of a rail car truck or wheel assembly B.

More particularly, and with continued reference to FIG. 1, truck assembly B includes first member which, in the preferred embodiment comprises a cross member 10 having a pair of elongated spaced apart and parallel end members 12,14 operably associated with the opposite end areas thereof so as to form a generally H-like configuration. Typically, cross member 10 will comprise a casting and will, therefore, have a somewhat roughened or uneven surface. End members 12,14 are secured to the cross member by conventional means which will allow some independent movement between them and the cross member. Typically, this means includes spring members or the like to provide some cushioning action. Details of this construction do not themselves form a part of the present invention and are already well known in the art.

A pair of spaced apart parallel axles 16,18 extend between end members 12,14 on opposite sides of cross member 10. Flanged wheels 20,22,24 and 26 are fixedly secured on the ends of the axles for rolling engagement with parallel rails or tracks as is known. An annular bearing surface 28 is centrally disposed on and extends upwardly from cross member 10 to provide one bearing surface between truck assembly B and the bottom wall or area of an associated rail car (not shown). An opening 30 is centrally disposed in annular bearing surface 28 and passes through cross member 10 for receiving a mounting member to facilitate a swivel connection between the truck assembly to an associated rail car. Again, the specifics of rail car truck assembly B do not themselves form a part of the present invention as such constructions are already known in the art. FIG. 1 is primarily for purposes of showing the preferred environment of use for the subject new system and method.

Figure 2:
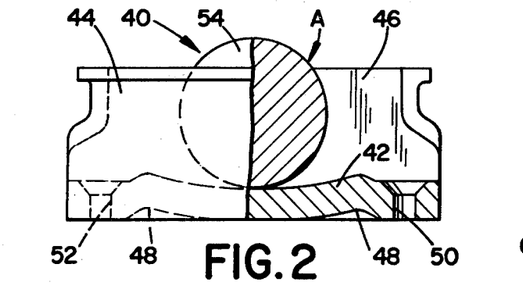
FIG. 2 is a cross-sectional view taken along lines 2—2 of FIG. 1 showing a typical roller side bearing assembly only which is adapted for use in conjunction with a particular fastener design.
Figure 4:
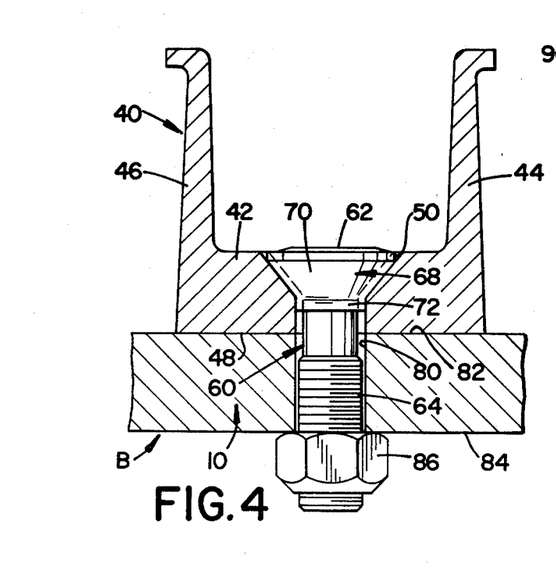
FIG. 4 is a cross-sectional view taken along lines 4—4 generally showing the cooperative relationships in accordance with the invention between the side roller bearing assembly, the rail car truck assembly and one of the elongated mechanical fasteners; and, FIG. 5 is a view similar to FIG. 3 showing another preferred configuration of an elongated mechanical fastener used in practicing the concepts of the invention.

Referring now to FIGS. 2 and 4, the details of one roller side bearing assembly A will be described, it being appreciated that the other assembly is identical thereto unless otherwise specifically noted. These roller side bearing assemblies are themselves also known and used in the art with one well known manufacturer thereof being A. Stucki Company of Pittsburgh, Pennsylvania. More particularly, the bearing assembly includes a second member which, in the preferred embodiment, comprises an elongated generally U-shaped bearing cage 40 defined by a bottom wall 42 having a pair of parallel spaced apart side walls 44,46 upstanding therefrom. Bottom wall 42 includes a bottom surface 48 which faces first or cross member 10 when the bearing cage is installed as will hereinafter be described. In the embodiment of the bearing cage shown for purposes of illustration, a pair of countersunk first openings 50,52 are spaced apart from each other longitudinally of and adjacent to the opposite ends of cage bottom wall 42. As shown, bottom surface 48 is slightly relieved adjacent to and inboard of openings 50,52. These relieved areas aid in locating bearing cage 40 on the typically rough surface of truck assembly cross member 10.

A cylindrical roller type bearing 54 is positioned to extend transversely of cage bottom walls 44,46 in engagement with bottom wall 42. The bottom wall itself includes a slightly arcuate configuration for retaining the bearing in position and the bearing diameter is such that a portion thereof extends above the top edge of side walls 44,46 for rolling type bearing engagement with the bottom area of an associated rail car. Although one bearing 54 is shown for purposes of describing the subject invention, other roller side bearing assembly constructions which employ a pair of such cylindrical rollers are also used in practical application. Also, some designs of roller side bearing assemblies include resilient pads on both sides of the roller bearing or bearings to control a phenomenon commonly referred to in the trade as "hunting". Generally, the single roller bearing arrangement is utilized for rail car constructions having capacities of 50 to 70 tons and the plural roller bearing constructions are utilized for rail cars of 90 ton capacities are above. Again, the specific details of roller side bearing assembly constructions are already known and do not, in and of themselves, form a part of the present invention.

Figure 3:
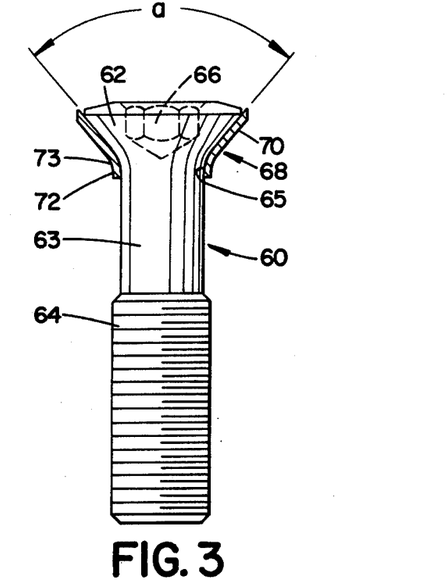
FIG. 3 is a side elevation of one preferred configuration of an elongated mechanical fastener utilized in practicing the invention in conjunction with the roller side bearing assembly of FIG. 2 and with the associated washer shown in cross-section for ease of illustration.

In fixedly securing side roller bearing assemblies A to rail car truck assembly B as shown in FIG. 1 and in accordance with the system and method of the subject invention, a plurality of elongated threaded fasteners are advantageously employed. One such fastener is shown in FIG. 3 and generally designated by numeral 60, it being understood that the other fasteners are identical thereto unless otherwise specifically noted. More particularly, fastener 60 comprises an elongated bolt having a countersunk head 62 and an elongated shank comprised of an unthreaded portion 63 and a threaded portion 64. It should be specifically noted that unthreaded portion 63 has a smaller diameter than threaded portion 64. Moreover, the interface between head 62 and unthreaded portion 63 is desirably radiused or filleted as at 65. This fillet is normally in the range of 0.330–0.420" for the particular bolt configuration shown and reduces stress concentrations during use.

Both of the foregoing features contribute to improved side bearing cage mounting as will be described hereinafter. Preferably, the included angle a (FIG. 3) defined by the side walls of the countersunk head is approximately 80°. However, variations from this preferred configuration may be advantageously employed.

A polygonal wrench receiving opening which, in the preferred embodiment, comprises a hex-type opening 66 extends axially inward into fastener 60 from the outermost end face of head 62. The dimensional characteristics of polygonal opening 66 are calculated in a precise manner and the mechanical properties of the fastener material are controlled during the manufacturing process so that the torque capacity of the opening is limited to a value no greater than a predetermined upper limit. The application of torque in excess of this designed value results in material yielding of the opening with substantially no further increase in clampload. For the application described herein, the opening has been designed to allow tightening of the fastener by the use of a ¾" square drive impact wrench to within the predetermined clampload limits. The self limiting torque feature of the design prevents over-tightening of the fastener if a larger size wrench is mistakenly used. The details for calculating the particular hex opening characteristics require mathematical computation by a formula known in the art. As such, elaboration on the details thereof is not deemed necessary in this specification.

By way of example only, the overall length of fastener 60 in the preferred application may be from 3 ½" to 4" with the length of threaded area 64 being approximately 2¼" and comprising a 7/8-9 UNRC-2A type thread. Fastener 60 is preferably constructed from an alloy steel which is quenched, tempered and meets SAE Grade 8 requirements. Also at least threaded area 64 is coated and lubricated. The foregoing dimensional and physical characteristics are merely exemplary and it will be appreciated that fasteners having other such characteristics may be advantageously employed to suit a particular installation without in any way departing from the overall intent or scope of the present invention.

With continued reference to FIG. 3, a washer member generally designated 68 is shown as received on fastener 60. This washer includes a frusto-conical portion 70 and a short cylindrical portion 72. The inner surface of frusto-conical portion 70 is dimensioned and configured to closely conform to countersunk head 62 with the outer surface of the frusto-conical portion being dimensioned and configured to closely conform to the countersunk portion of bearing cage bottom wall opening 50. In the preferred arrangement, countersunk head 62 also closely conforms to the countersunk portion of opening 50. Cylindrical washer portion 72 closely surrounds the short length of the fastener shank and is dimensioned relative to threaded area 64 so that washer 68 is captured on fastener 60. The interface between washer portions 70,72 is radiused as at 73, substantially commensurate with bolt head fillet 65.

While in most cases, washers are utilized for sealing purposes or for obtaining a locking arrangement between a fastener and an associated component, washer 68 of the subject invention performs an entirely different function in that it is designed to protect bolt head fillet area 65 against contact with bearing cage 40. That is, fillet 65 may itself be greater in size than the corresponding fillet areas of more conventional bolts and is protected from the typically sharp edges of bearing cage mounting openings 50,52 which would imbed and create stress concentrations in the fillet areas of such standard or conventional bolts. In addition, the arrangement of washer 68 acts as a bearing surface to generally isolate the bolt from the bearing cage and truck assembly cross member during bolt tightening as will be described. This, in effect, allows some control of frictional forces occurring between the bolt head, washer and associated bearing cage mounting opening during such tightening. In this embodiment, washer 68 is preferentially sacrificed if during side roller bearing installation there occurs a condition of interference between the sharp edges of openings 50,52 and the fasteners. This preserves the integrity of the fasteners without loss of clampload. Also, control of the surface finish of fastener head 62 and washer portion 70 enhance control of the frictional forces during the tightening process.

Referring particularly to FIGS. 1 and 4, description will hereinafter be made with reference to using fasteners of the type just described for purposes of fixedly securing side roller bearing assemblies A to rail car truck assembly B. As shown in FIG. 1, two such side roller bearing assemblies are secured to cross member 10 of the truck with these assemblies being disposed on opposite sides of annular bearing surface 28 in a generally parallel relationship to each other and to end members 12,14. It will be appreciated, however, that other positioning arrangements and/or additional bearing assemblies could be advantageously employed to accommodate various specific applications. As shown in FIG. 1, two of fasteners 60 are employed to fixedly secure each bearing assembly A to the truck and description will hereinafter be made with reference to installation of one such fastener. It will be appreciated that installation of the others is identical thereto unless otherwise specifically noted.

In FIG. 4, fastener 60 is passed through countersunk first opening 50 in bearing cage bottom wall 42 and a registered second opening 80 extending between the top surface portion 82 and an underside surface portion 84 of first of cross member 10. With such installation, frusto-conical portion 68 of washer member and countersunk head 62 of the fastener are closely seated within the countersunk area of opening 50. Radiused area 73 of washer 68 engages the sharp corner at the innermost end of the countersunk portion of opening 50 to protect bolt head fillet 65. In addition, shank threaded portion 64 extends outwardly from underside surface portion 84 for threaded receipt in a retaining means which, in the preferred embodiment, comprises a locknut 86 with shank unthreaded portion 63 being radially spaced from engagement with either of openings 50,80. The retaining means or locknut may comprise any one of a number of different types and styles of such nuts and permits only a very limited amount of hand threading thereof onto threaded area 64. In the preferred embodiment, a locknut of the type manufactured and marketed by The Lamson & Sessions Co. (assignee of the subject application) under the trademark STOVER is preferred, but not necessary. By way of example only, and commensurate with the above example for fastener 60, the lock nut utilized in the preferred arrangement has a 7/8-9 UNC-2B thread. Once the locknut has been started on threaded area 64, it is necessary to employ wrench means to finalize or complete tightening.

In practicing the concepts of the subject invention, tightening is desirably performed by rotating elongated fastener 60 and retaining lock nut 86 generally stationary. It has been found that the greatest amount of frictional forces acting on the fastener and nut during such tightening occur at the area of engagement of the fastener or bolt head with the adjacent component. Therefore, since it is desired to obtain a clampload in fastener 60 within predetermined upper and lower limits as a function of tightening torque, reduction and/or control of frictional forces at this area during fastener torquing will better facilitate obtaining acceptable clamploads in successive fastener installations. The structural configurations along with the cooperative relationship between and surface finishes of the fastener head and washer act to reduce and control the frictional forces. In the preferred arrangement here under discussion, a clampload generally in the range of 25,000–35,000 lbs. is desired. At some increment above this range, failure of bearing cage 40 will usually occur and at some increment below this range, the likelihood of bolt or fastener failure increases.

To obtain the foregoing results, elongated fastener 60 shown in FIG. 4 is rotated relative to the locknut 86 by means of an appropriate drive tool received in hex opening 66. In the application being described, the hex opening is dimensioned to receive a 9/16" hex driver used in conjunction with a ¾" square drive impact wrench, although the opening could be designed to accommodate other tool types and sizes. Locknut 86 is retained generally stationary by means of a conventional wrench or the like. In rotating fastener 60 to threadedly advance it into the locknut and effect loading thereof, the amount of torque applied determines the final fastener clampload.

As previously described, the design characteristics of hex opening 66 are such that a predetermined torque value will cause material yielding of the opening. This value is correlated to fastener clampload in a manner such that the fastener may not be placed in an overtightened condition which could cause failure of bearing cage 40. The general correlation between torque and clampload in the environment involved may be predetermined under, for example, mathematical and laboratory conditions. Because the fastener is in a generally isolated relationship relative to those components being fastened together and since there is substantial duplication of mounting conditions between individual fastener installations, application of generally the same amount of tightening torque at each fastener installation will result in acceptable clamploads being obtained.

The capability of the fasteners to resist over-tightening by means of opening 66 with a limited maximum torque capacity is significant in the preferred environment of use for the development. It is highly desirable that the fasteners have the capability of being installed by those tools conventionally available in railroad shops. Torque controlled impact wrenches are not standard or conventional in these shops so that fastener over-tightening would otherwise be a distinct, undesirable result.

As noted above with reference to FIG. 2, bottom surface 48 of bearing cage bottom wall 42 is configured to theoretically engage the surface of the truck assembly cross member at three (3) spaced apart areas, i.e., at a generally central portion of the bottom wall beneath roller 54 and adjacent each of cage bottom wall openings 50,52. While such seating is extremely desirable, it is, from a practical point of view, very difficult to achieve. The problem principally resides in the roughened or uneven surface of the interfacing components, particularly the rough surface characteristics of cross member top surface portion 82 (FIG. 4). As a result, mounting of a roller side bearing assembly A to truck assembly B will most often result in a situation where the central portion of cage bottom surface 48 is slightly spaced from positive contact with top surface portion 82. This then creates a cantilever-like relationship in bearing cage bottom wall 42 between the central portion thereof and each of opposed ends adjacent openings 50,52.

The end result of the foregoing relationship during normal or typical movement of a rail car along a set of rails, is periodic or cyclical loading of roller 54 in a generally vertical direction. This, in turn, imparts tensile loads bending loads or shear forces to the fasteners. In effect, the bending loads have the tendency of attempting to bend the fasteners toward each other. The cyclical nature of these loads will cause bending fatique in the fasteners resulting in premature fastener failure. Moreover, the sharp edge areas associated with openings 50,52 will have a tendency to imbed the fasteners at the fillet areas and thus create stress concentrations therein. In conventional threaded fasteners, the above noted bonding loads and stress concentrations yield unsatisfactory results by way of premature fastener failure.

These difficulties are, however, overcome in using the concepts of the subject invention. The geometry of washer 68 is such that a larger fastener head fillet 65 may be employed. This feature advantageously reduces the potential for developing stress concentrations at those areas of the fasteners. Moreover, the washer conformation is such that portions 70,72 and 73 thereof protect fastener head 62, fillet area 65 and a short section of unthreaded shank portion 63 immediately adjacent the fillet. When bearing cage 40 is installed as described above, the washer 68 associated with each fastener is thus subjected and stress configurations caused from being embedded by the sharp edges of openings 50,52. Indeed, the washers are intentionally sacrificed to protect the integrity of the fasteners. That is, the washers are intentionally permitted to deform or break in the area of fillets 73 during the course of cyclical bending type loading as described above and thereby absorb the physical damage which would otherwise occur in the fasteners themselves. This is designed to occur without loss of clampload. The desirable result is in substantially improved bending fatigue characteristics for the fastener installations. Still further, the undersized or reduced diameter of unthreaded shank portion 63 in each fastener acts to reduce or lower the fastener bending stresses when the above described bending loads are applied thereto.

In using the arrangement described above, it has been determined through testing that the fasteners will survive the application of at least one million cycles of bending loads thereto. The tests comprise cyclical vertical impact loading of roller 54 in roller side bearing assembly A so as to simulate the type of destructive loading encountered during typical rail car operation. Survival of one million loading cycles is generally the equivalent of 15 years of rail car service under typical operating conditions. This represents a substantial improvement over results obtained from using standard threaded fasteners and/or other previously used systems for mounting roller side bearing assemblies to rail car trucks. The particular system described above with reference to FIGS. 1–4 is particularly adapted for use on the type of bearing cage designs normally associated with rail cars of the so-called 100 ton or so category.

Figure 5:
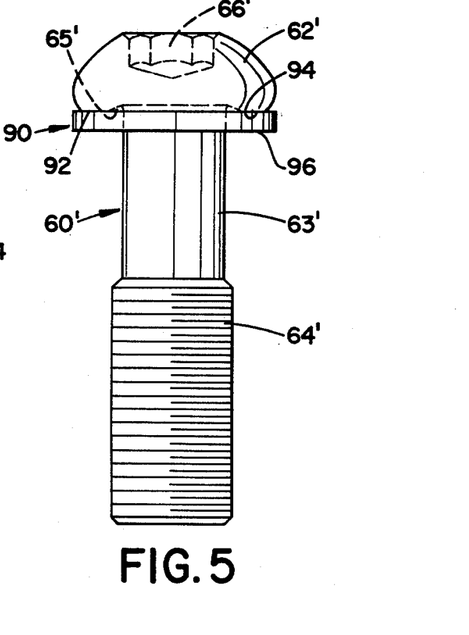

Another preferred type of fastener design which is used in practicing the concepts of the overall new system is shown in FIG. 5. For ease of illustration in appreciating this alternative, like component areas are identified by like numerals with a primed (') suffix and new component areas are identified by new numerals. The fastener of FIG. 5 is particularly adapted for use on the type of bearing cage designs normally associated with rail cars of the so-called 50–70 ton or to category. In this rail car category, the stress encountered by the fasteners is typically higher because of increased bending loads.

With reference to FIG. 5, the fastener itself is generally designated 60' being comprised of a button or mushroom-like head 62' and an elongated shank having an unthreaded portion 63' and a threaded portion 64'. Here too, unthreaded portion 63' has a smaller diameter than threaded portion 64'. The interface between the head and shank is filleted or radiused as at 65' for reducing stress concentrations during use. In this construction, the radius is typically in the range of 0.030–0.060" and extends generally inward into head 62' for purposes of isolation. As previously described, these two features contribute to improved results for a side bearing cage mounting.

A hex-type wrench receiving opening 66' extends axially inward into the fastener from the end face of head 62'. The dimensional characteristics of this opening are such that a predetermined torque value will cause material yielding of the opening which substantially prevents further tightening of the fastener. This capability is desirable for preventing fastener overtightening as previously described.

Continuing with reference to FIG. 5, an annular washer member generally designated 90 is received on the fastener shank. The inner diameter of this washer is dimensioned so as to accommodate sliding movement of the washer relative to shank unthreaded portion 63' in a captured relationship thereon by shank threaded portion 64'. The outer diameter of the washer is substantially coextensive with the outer diameter of head 62'. As will be seen, the washer is adapted to have one face 92 thereof engage bottom surface 94 of the fastener head with fastener fillet 65' being protectively spaced therefrom. As with the other embodiment of the fastener, such protection is highly desirable from the standpoint of preventing the sharp edges of the bearing cage mounting openings from imbedding the fasteners and creating stress concentrations.

In the roller side bearing assembly for which the fastener of FIG. 5 is particularly designed, the bearing cage mounting openings are not countersunk. Rather, they comprise straight walled through openings so that washer 90 and fastener head 62' of each fastener installation will be located above the surface portion of the associated bearing cage bottom wall with the washer other face 96 engaging the top surface portion. Washer member 90 also acts to isolate the associated fastener 60' from the bearing cage and truck assembly cross member in order that the attendant frictional forces may be controlled to achieve a fastener clampload which is within an acceptable range. As with the other fastener embodiment, each fastener 60' is rotated into threaded engagement with its associated locknut to assure consistent and reliable achievement of the desired clamploads.

In the case of fasteners 60' when used to fixedly secure a roller side bearing assembly to a rail car truck, a clampload generally in the range of 20,000–30,000 lbs. is preferred. At some increment above this range, failure of the associated bearing cage will again occur and at some increment below this range, the likelihood of fastener failure increases. The same resistance to bending fatigue and the like as is achieved from the embodiment of FIGS. 1–4 is also achieved from the alternative embodiment of FIG. 5 during fastener use in the preferred environment. Since these benefits were described in detail hereinabove, it is deemed unnecessary to repeat them here.

The invention has been described with reference to preferred embodiments. Obviously, modifications and alterations will occur to others upon the reading and understanding of this specification. Such modifications may, for example, primarily reside in certain details of the fasteners and associated washer members for accommodating various alternative roller side bearing assembly constructions and the like. It is intended, however, to include all such modifications and alterations insofar as they come within the scope of the appended claims or the equivalents thereof.

Having thus described the invention, it is now claimed:

1. An arrangement for mounting a roller side bearing assembly to a rail car truck assembly, said arrangement comprising in combination:

a truck assembly including spaced wheels adapted to rollingly support said rail car on a pair of parallel spaced apart tracks, said assembly including a top surface portion;

a side roller bearing assembly having an elongated generally U-shaped bearing cage including a bottom wall and a pair of spaced apart generally parallel side walls upstanding therefrom, said bottom wall having at least a pair of spaced apart openings extending therethrough in registry with at least a pair of openings in said truck top surface portion, said bearing cage side walls having at least one cylindrical bearing member extending therebetween adapted to supportingly engage an area of said rail car for reducing frictional forces generated during swivel movement between said car and truck assembly;

an elongated threaded fastener extending through each of said pairs of registered bottom wall and top surface portion openings, said fasteners each having a head and an elongated shank threaded along at least the outermost end section thereof wherein said head and shank interface with each other at a distinct fillet area, said head cooperating with said bottom wall and said shank extending through an associated pair of registered bottom wall and top surface portion openings with said threaded outermost end disposed in threaded engagement with retaining means disposed on the underside of said top surface portion, said threaded fasteners being placed in some desired clampload condition within predetermined upper and lower limits as a function of rotating said fasteners to secure threaded advancement thereof into said retaining means, said desired clampload being less than an amount which would cause failure in said bearing cage and greater than an amount which increases the potential for failure in said fasteners when said fasteners are subjected to tensile and bending loads resulting from loading of said roller side bearing assembly during rolling travel of said rail car along said track, said fasteners each further including means for limiting the torque applied thereto during fastener rotation into threaded advancement with said retaining means whereby the resultant fastener clamploads may not exceed said upper limit; and, bearing means interposed between the head of each fastener and said bearing cage bottom wall to facilitate control of frictional forces occurring at said fastener heads during rotation thereof into threaded engagement with said retaining means, said bearing means further protecting the fillet areas of said fasteners from being imbedded by said bearing cage bottom wall at said bottom wall openings at least when said fasteners are subjected to tensile and bending loads.

2. The combination as defined in claim 1 wherein each fastener shank includes an unthreaded section extending from said fillet area and merging into said threaded section, said unthreaded section having a smaller diameter than said threaded section for reducing stresses in said fastener when said bending loads are applied thereto.

3. The combination as defined in claim 1 wherein said bearing means comprises a washer member captured on the shank of each fastener.

4. The combination as defined in claim 3 wherein said bearing cage bottom wall openings are countersunk with said fastener head being similarly countersunk and received in said bearing cage bottom wall openings, said washers each having a frusto-conical portion substantially conforming to the countersunk configuration of the associated fastener head and a fillet portion substantially conforming to the fillet area of the associated fastener, whereby said washers are intentionally permitted to be imbedded by said bearing cage bottom wall at said bottom wall openings and at least at the fillet areas thereof when said bending loads are applied to said fasteners and thereby protect said fasteners from stress concentrations.

5. The combination as defined in claim 3 wherein said washers have a flat configuration and are interposed between said bearing cage bottom wall and the head of the associated fastener, the filleted area of each fastener extending generally inwardly into the fastener head in a spaced relationship from the associated washer.

6. The combination as defined in claim 1 wherein said torque limiting means comprises a wrench receiving opening in each fastener head, said wrench receiving opening being dimensioned and configured to possess a predetermined maximum torque capacity after which material yielding of the opening substantially prevents further tightening during threaded advancement of each fastener into its associated locknut.

7. A mechanical fastening system for fixedly securing the bottom wall of a side roller bearing cage to a top surface portion of a rail car truck for accommodating swivel movement between said truck and an associated rail type car wherein said bottom wall and top surface portion each have at least one opening which may be placed in registry with each other, said fastening system comprising:

an elongated threaded fastener extending through the registered openings in said bottom wall and top surface portion, said fastener having a head and an elongated shank threaded along at least the outermost end section thereof wherein said head and shank interface with each other at a distinct fillet area, said head being cooperable with said bottom wall with said shank having a length sufficient to extend through the registered openings in said bottom wall and top surface portion so that said threaded outermost end is disposed in threaded engagement with a retaining means disposed on the underside of said top surface portion, said threaded fastener being placed in some desired clampload condition within predetermined upper and lower limits by rotating said fastener into threaded advancement with said retaining means, wherein said desired clampload is less than an amount which would cause failure in said bearing cage and greater than an amount which increases the potential for failure in said fastener when it is subjected to tensile and bending loads resulting from loading of said side roller bearing cage during rolling travel of said rail car, said fastener further including means for limiting the torque applied thereto during fastener rotation into threaded advancement with said retaining means whereby the resultant fastener clampload may not exceed said upper limit; and, bearing means associated with said fastener and interposed between said fastener head and bearing cage bottom wall to facilitate control of frictional forces occurring at said head as said fastener is rotated into threaded engagement with said retaining means, said bearing means further protecting the fillet area of said fastener from being imbedded by the edges of said bearing cage bottom wall opening at least when said fastener is subjected to tensile and bending loads.

8. The system as defined in claim 7 wherein said fastener shank includes an unthreaded section extending from said fillet area and merging into said threaded section, said unthreaded section having a smaller diameter than said threaded section for reducing stresses in said fastener when bending loads are applied thereto.

9. The system as defined in claim 7 wherein said bearing means comprises a washer member received on said fastener shank, said bearing cage bottom wall opening being countersunk with said fastener head being similarly countersunk and received by said bearing cage bottom wall opening, said washer having a frusto-conical portion substantially conforming to the countersunk configuration of said fastener head and a fillet portion substantially conforming to the filleted area of said fastener, whereby said washer is intentionally permitted to be imbedded by said bearing cage bottom wall at said bottom wall opening edges at least at the fillet area thereof as a result of said bending loads to thereby protect said fastener from stress concentrations.

10. The system as defined in claim 7 wherein said bearing means comprises a flat washer member received on said fastener shank and interposed between said fastener head and bearing cage bottom wall, the fillet area of said fastener extending generally into said fastener head in a spaced relationship from said washer.

11. A method for fixedly securing the bottom wall of a roller side bearing cage to the top surface portion of a rail car truck assembly, said method comprising the steps of:

passing the elongated shank of at least one mechanical fastener having a threaded section at least along the outermost end thereof through registered openings in said bottom wall and top surface portion such that an enlarged head on said fastener is cooperable with said bottom wall;

interposing a bearing member between said fastener head and bottom wall for controlling frictional forces occurring therebetween and for protecting a distinct fillet area on said fastener at the interface between said head and shank when bending loads are applied to said fastener in response to normal movement of a rail car with which said truck assembly is associated;

rotating said fastener at said head to threadedly advance said shank threaded section into retaining means disposed on the underside of said top surface portion;

continuing said step of rotating until a clampload within predetermined upper and lower limits is obtained in said fastener; and, providing means associated with said fastener head for limiting the amount of torque which may be applied thereto during said step of continuing whereby the resultant clampload will not exceed said upper limit.

12. The method as defined in claim 11 wherein said step of providing comprises including a polygonal wrench receiving opening in said fastener head and dimensioning said wrench receiving opening so that the flats thereof will yield in response to a tool member being received therein and exerting some predetermined torque thereagainst which is generally correlated to having reached a fastener clampload generally approaching said upper limit.

13. An arrangement for fixedly mounting a first member to a second member, said arrangement comprising in combination:

a first member including a mounting surface portion having at least one first opening extending therethrough;

a second member including a wall having at least one second opening extending therethrough in registry with said first opening;

an elongated threaded fastener extending through said registered first and second openings, said fastener having a head and an elongated shank threaded along at least the outermost end section thereof wherein said head and shank interface with each other at a distinct fillet area, said head cooperating with said second member wall and said shank extending through said registered first and second openings with said threaded outermost end disposed in threaded engagement with retaining means disposed on the underside of said first member mounting surface portion, said threaded fastener being placed in some desired clampload condition within predetermined upper and lower limits as a function of rotating said fastener to secure threaded advancement thereof into said retaining means, said desired clampload being less than an amount which would cause failure in said second member and greater than an amount which increases the potential for failure in said fastener when said fastener is subjected to tensile and bending loads resulting from relative loading between said first and second members, said fastener further including means for limiting the torque applied thereto during fastener rotation into threaded advancement with said retaining means whereby the resultant fastener clampload may not exceed said upper limit; and, bearing means interposed between the head of said fastener and said second member wall to facilitate control of frictional forces occurring at said fastener head during rotation thereof into threaded engagement with said retaining means, said bearing means further protecting the fillet area of said fastener from being imbedded by said second member wall at said second opening at least when said fastener is subjected to tensile and bending loads.

14. The combination as defined in claim 13 wherein said fastener shank includes an unthreaded section extending from said fillet area and merging into said threaded section, said unthreaded section having a smaller diameter than said threaded section for reducing stresses in said fastener when tensile and bending loads are applied thereto.

15. The combination as defined in claim 13 wherein said bearing means comprises a washer member captured on the shank of said fastener.

16. The combination as defined in claim 15 wherein said second opening is countersunk in said wall with said fastener head being similarly countersunk and received in said second opening, said washer having a frusto-conical portion substantially conforming to the countersunk configuration of said fastener head and a fillet portion substantially conforming to the fillet area of said fastener, whereby said washer is intentionally permitted to be imbedded by said second member wall at said second opening and at least at the fillet area thereof when tensile and bending loads are applied to said fastener for protecting said fastener from stress concentrations.

17. The combination as defined in claim 15 wherein said washer has a flat configuration and is interposed between said second member wall and the head of said fastener, the filleted area of said fastener extending generally inwardly into the fastener head in a spaced relationship from said washer.

18. The combination as defined in claim 13 wherein said torque limiting means comprises a wrench receiving opening in said fastener head, said wrench receiving opening being dimensioned and configured to possess a predetermined maximum torque capacity after which material yielding of the opening substantially prevents further tightening during threaded advancement of said fastener into said retaining means.

19. A mechanical fastening system for fixedly securing a first member to a mounting surface portion of a second member wherein said first and second members each have at least one opening therethrough which may be placed in register with each other, said fastening system comprising:

an elongated threaded fastener extending through the registered openings in said first and second members, said fastener having a head and an elongated shank threaded along at least the outermost end section thereof wherein said head and shank interface with each other at a distinct fillet area, said head being cooperable with said first member with said shank having a length sufficient to extend through the registered openings in said first and second members so that said threaded outermost end is disposed in threaded engagement with retaining means disposed on the underside of said second member mounting surface portion, said threaded fastener being placed in some desired clampload condition within predetermined upper and lower limits by rotating said fastener into threaded advancement with said retaining means, wherein said desired clampload is less than an amount which would cause failure in said first member and greater than an amount which increases the potential for failure in said fastener when it is subjected to bending and tensile loads resulting from relative loading of said first and second members, said fastener further including means for limiting the torque applied thereto during fastener rotation into threaded advancement with said retaining means whereby the resultant fastener clampload may not exceed said upper limit; and, bearing means associated with said fastener and interposed between said fastener head and said first member to facilitate control of frictional forces occurring at said head as said fastener is rotated into threaded engagement with said retaining means, said bearing means further protecting the fillet area of said fastener from being imbedded by the edges of said first member opening at least when said fastener is subjected to bending and tensile loads.

20. The system as defined in claim 19 wherein said fastener shank includes an unthreaded section extending from said fillet area and merging into said threaded section, said unthreaded section having a smaller diameter than said threaded section for reducing stresses in said fastener when bending and tensile loads are applied thereto.

21. The system as defined in claim 19 wherein said bearing means comprises a washer member received on said fastener shank, said first member opening being countersunk with said fastener head being similarly countersunk and received by said first member opening, said washer having a frusto-conical portion substantially conforming to the countersunk configuration of said fastener head and a fillet portion substantially conforming to the filleted area of said fastener, whereby said washer is intentionally permitted to be imbedded by said first member at the edges of said first member opening at least at the fillet area thereof as a result of bending and tensile loads to thereby protect said fastener from stress concentrations.

22. The system as defined in claim 19 wherein said bearing means comprises a flat washer member received on said fastener head and bearing cage bottom wall, the fillet area of said fastener extending generally into said fastener head in a spaced relationship from said washer.

* * * * *